United States Patent
Kondo et al.

(10) Patent No.: US 6,718,241 B2
(45) Date of Patent: Apr. 6, 2004

(54) VEHICLE TRAVEL CONTROL APPARATUS

(75) Inventors: Satoshi Kondo, Utsunomiya (JP); Shinnosuke Ishida, Tokorozawa (JP); Jun Tanaka, Utsunomiya (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 25 days.

(21) Appl. No.: 10/231,135

(22) Filed: Aug. 30, 2002

(65) Prior Publication Data
US 2003/0045982 A1 Mar. 6, 2003

(30) Foreign Application Priority Data
Sep. 4, 2001 (JP) ........................................ 2001-267795

(51) Int. Cl.[7] ............................................... B62D 6/00
(52) U.S. Cl. .............................. 701/41; 701/1; 348/148; 348/119; 180/443; 180/168
(58) Field of Search ..................... 701/1, 41; 348/148, 348/119; 180/443, 168

(56) References Cited

U.S. PATENT DOCUMENTS

| 5,485,378 A | * | 1/1996 | Franke et al. .................. 701/41 |
| 5,667,033 A | * | 9/1997 | Shimizu et al. .............. 180/272 |
| 5,938,707 A | * | 8/1999 | Uehara ......................... 701/41 |
| 6,178,365 B1 | * | 1/2001 | Kawagoe et al. .............. 701/41 |
| 6,282,478 B1 | * | 8/2001 | Akita ........................... 701/70 |
| 6,580,986 B1 | * | 6/2003 | Uenuma et al. ............... 701/41 |
| 2002/0169531 A1 | * | 11/2002 | Kawazoe et al. ............. 701/41 |

* cited by examiner

Primary Examiner—Thomas G. Black
Assistant Examiner—Ronnie Mancho
(74) Attorney, Agent, or Firm—Arent Fox PLLC

(57) ABSTRACT

The invention carries out appropriate travel control so that a vehicle travels along recognized lane markings, and at the same time, prevents making the driver feel discomfort during travel control. In the case that the white line recognition becomes not possible, the delay time TD is shortened depending on a previous continuous time interval of a recognition state. In the case that the white line recognition flag becomes possible, the delay time TD is extended depending on the previous continuous time interval. In the case that the count value of the ON time measuring counter TON is equal to or greater than the delay time TD and the white line recognizing is possible, the compensation control is permitted, and reversion to the ON state of the travel control based on recognized white lines is permitted.

10 Claims, 8 Drawing Sheets

VEHICLE TRAVEL CONTROL APPARATUS

BACKGROUND OF THE INVENTION

1. Field of the Invention

The present invention relates to a travel control apparatus that recognizes lane markings on the road from images recorded by a camera, and carries out travel control such that the vehicle travels along these lane markings.

2. Description of the Related Art

In the conventional vehicle steering apparatus disclosed, for example, in Japanese Unexamined Patent Application, First Publication, No. Hei 11-78948, is known in which lines on the road (for example, lane markings such as white lines) are detected by processing images obtained from a camera mounted on the vehicle that records the travel path, and compensates the steering torque input by the driver so that the vehicle travels along this line.

However, in the vehicle steering apparatus according to the conventional technology described above, in the case that the detection of the lines on the road is impossible, the execution of the steering control that compensates the steering torque input by the driver is suspended, and inappropriate steering control is prevented by restarting the steering control at a point in time when the detection of the line on the road can be detected.

However, the frequency that the detection of lines on the road becomes impossible due to the state of the surface of the road being traveled, or the state of the road surface, for example, accumulated snow, a bad surface, a wet surface, or the road surface in a tunnel or the like is high, and there are cases in which the steering control is switched on and off frequently. Thereby, the compensation of the steering torque input by the driver switches ON and OFF frequently, and there is a concern that this may cause discomfort for the driver.

In consideration of the above described problems, it is an object of the present invention to provide a travel control apparatus for a vehicle that carries out appropriate travel control so that the vehicle travels along recognized lane markings, and at the same time can prevent making the driver feel discomfort while travel control is being carried out.

SUMMARY OF THE INVENTION

In order to solve the problems described above and attain the object, in a first aspect of the vehicle travel control apparatus according to the present invention that comprises a travel path recognizing device (for example, the camera 25 and the image recognition processing unit 26 in the embodiments described below) that recognizes the travel path of the vehicle, a recognition condition determining device (for example, step S 01, step S 04, and step S 07 in the embodiments described below) that determines the quality of the recognition condition of the travel path recognizing device, and a travel control device (for example, step S 10 in the embodiments described below) that determines the possibility of executing the travel control for the vehicle using the results of the recognition of said travel path recognizing device based on the results of the determination of the recognition condition determining device, wherein said travel control device determines the possibility of executing the travel control for the vehicle based on at least one of the favorably determined continuous condition or the unfavorably determined continuous condition that is determined by the recognition condition determining device.

According to a vehicle travel control apparatus having the structure described above, the travel path recognition device analyses image data or the like of the travel path obtained by video recording using, for example, cameras mounted on the vehicle, and recognizes the lane markings, such as the white lines, on the travel path. At this time, the recognition condition determining device determines the quality of, for example, the recognition condition of the sequence of recognition processing and recognition results in the travel path recognizing device, for example, the possibility of recognition or the precision of the recognition results. In addition, the possibility of executing the travel control depends not simply on the results of the determination of the quality of the recognition condition determining device, but also on each continuing condition of the quality determination, such as the history of each continuous time interval.

Thereby, for example, even in the case that the quality determination in the recognition condition determining device switches frequently, it is possible to prevent the accompanying possibility of execution of the travel control from switching frequently, and the recognition condition determining device appropriately sets the possibility of execution of the travel control such that it is appropriately switched depending on each continuation condition of a favorable determination or unfavorable determination, and thereby it is possible to prevent the driver from feeling discomfort.

In a second aspect of the vehicle travel control apparatus according to the present invention, said continuous condition of the quality determination by the recognition condition determining device is the continuous time interval from the starting time of the favorable determination or unfavorable determination (for example, the count value of the ON time measuring counter TON and the count value of the OFF time measuring counter TOFF in the employments described below), and said travel control device determines the possibility of execution of the travel control of the vehicle based on a reference time (for example, the delay time TD in the embodiments described below) that is increased or decreased depending on the continuous time interval.

According to the vehicle travel control apparatus having the structure described above, for example, the longer the continuous time interval of the favorable determination, the travel control device determines that there exists a state appropriate for executing the travel control using the result of the recognition of the travel path recognizing device, and the reference time, for example the delay time when the possibility of execution of the travel control is switched, is decreased. In contrast, for example, the longer the continuous time interval of the unfavorable determination, the travel control device determines that there exists a state that is not appropriate for executing the travel control using the result of the recognition of the travel path recognizing device, and a reference time, for example, the delay time when the possibility of execution of the travel control is switched, is increased.

Thereby, the travel control device can determine the possibility of executing travel control by suitably determining whether or not it is in a state appropriate for executing the travel control using the result of the recognition of the travel path recognizing device based on the reference time, and thereby it is possible to prevent making the driver feel discomfort while travel control is being executed.

Furthermore, a third aspect of the vehicle travel control apparatus according to the present invention comprises a reference time update device (for example, step S 02 and step S 05 in the embodiments described below) that decreases said reference time in the case that there is a favorable determination by the recognition condition determining device and increases said reference time in the case that there is an unfavorable determination by the recognition condition determining device, and said travel control device compares the reference time with the favorable determination continuous time interval (for example, the count value of the ON time measuring counter TON in the embodiments described below) that is the continuous time interval from the start time of the favorable determination by said recognition condition determination device, and when the favorable determination continuous time interval is longer than said reference value, the execution of the travel control of the vehicle is permitted.

According to the vehicle travel control apparatus having the structure described above, during the switching of the possibility of execution of the travel control, for example, from the state in which the execution of the travel control is not permitted, when switching to the state in which execution is permitted, in the state in which execution of the travel control is not permitted, the reference time update device measured the continuous time interval of the unfavorable determination by the recognition condition determining device, and then increases the reference time, for example the delay time when switching the possibility of execution of the travel control, according to the continuous time interval of this unfavorable determination.

In addition, when there is a favorable determination by the recognition condition determining device, the travel control device compares the favorable determination continuous time interval, which is the continuous time interval from the start time of this favorable determination, with the reference time, and in the case that the favorable determination continuous time interval continues long enough to exceed the reference value, the execution of the travel control is permitted. Therefore, in the case that the favorable determination continuous time interval does not satisfy the reference time, the execution of the travel control is not permitted, and the state in which it is not permitted continues.

Thereby, for example, in the case that the favorable determination in the recognition condition determining device switches frequently, the travel control device determines that a state that is appropriate for executing travel control using the result of the recognition of the travel path recognition device does not exist, and frequent switching of the possibility of execution of the travel control can be prevented, and thereby it is possible to prevent making the driver feel discomfort while the travel control is being carried out.

Furthermore, in a fourth aspect of the vehicle travel control apparatus according to the present invention, it is possible to change at least one of either the ratio of the decrease (for example, the delay time shortening gain GR in the embodiments described below) when decreasing the reference time in the case that there is a favorable determination by said recognition condition determining device or the ratio of the increase (for example, the delay time extending gain GE in the embodiments described below) when increasing the reference time in the case that there is an unfavorable determination by said recognition condition determining device.

According to the vehicle travel control apparatus having the structure described above, the possibility of execution of the travel control can be switched even more appropriately for example, by allowing updating depending on the ratio of the increase or the ratio of the decrease of the reference time in addition to each continuous time interval of the quality determination when updating the reference value that serves as the delay time or the like when switching the possibility of execution of the travel control.

Furthermore, a fifth aspect of the vehicle control apparatus according to the present invention comprises an actuator (for example, the motor 20 in the embodiments described below) that drives a steering mechanism (for example, the manual steering power generating mechanism 16 in the embodiments described below) that can steer the front steering wheels (for example, the front steering wheels 19, 19 in the embodiments described below) of the vehicle, and a drive control device (for example, the EPS control apparatus 24 in the embodiments described below) that drives the actuator such that the vehicle travels along said travel path that has been recognized by the travel path recognizing device, wherein said drive control device updates the compensation proportion when compensating the steering torque based on the result of the determination of said recognition condition determining device.

According to a vehicle travel control apparatus having the structure described above, the travel control device determines the possibility of execution of the travel control according to each of the continuation conditions of the quality determination of the recognition condition determining device, and at the same time, updates the amount of the compensation of the steering torque during travel control depending on the result of the quality determination by the recognition condition determining device.

Thereby, the switching timing of the possibility of execution of the travel control can be appropriately set, and at the same time, the compensation proportion of the steering torque can be set to an appropriate value, and it is possible to prevent even further making the driver feel discomfort during travel control.

Furthermore, in a sixth aspect of the vehicle travel control apparatus according to the present invention, the larger the continuous proportion of the favorable determination by the recognition condition determining device, the more said drive control device increases the compensation proportion.

According to the vehicle travel control apparatus having the structure described above, the larger the continuation proportion of the favorable determination by the recognition condition determining device, i.e., the longer the continuous time interval of the favorable determination, the drive control device determines that there is a state suitable for executing the travel control using the result of the recognition of the travel path recognition device, and the compensation proportion of the steering torque during execution of the travel control is increased.

Thereby, during the condition suitable to executing the travel control, the steering of the driver is appropriately assisted during travel on a high-speed highway during clear or rainy weather or the like.

Furthermore, a seventh aspect of the vehicle travel control apparatus of the present invention comprises a deviation determining device (for example, the LKAS control apparatus 23 in the embodiments described below) that recognizes the position of the vehicle in the traverse direction of the travel path based on the result of the recognition of said travel path recognizing device, and when the position of this vehicle arrives at a predetermined reference position (for example, the deviation warning start threshold value TH1 in the embodiments described below) that indicates the deviation from the travel path, determines whether or not there is the possibility that the vehicle will deviate from the travel path, wherein the deviation determining device updates said reference position based on the result of the determination of the recognition condition determining device.

According to the vehicle travel control apparatus having the structure described above, in the case that the position of the vehicle with respect to the lane markings on the travel path recognized by the travel path recognition device departs from the predetermined reference position by a certain amount, the deviation determining device determines that there is the possibility that the vehicle will deviate from the travel path. At this time, the deviation determining device updates the reference position based on the result of the quality determination of the recognition condition determining device, and by making the recognition condition of the sequence of recognition processing and the result of the recognition or the like in the travel path recognizing device reflect the setting of the reference position, it is possible to carry out suitable deviation determination that depends on whether or not there exists a condition requiring caution during travel.

Furthermore, in an eighth aspect of the vehicle travel control device according to the present invention, the smaller the continuous proportion of the favorable determination by said recognition condition determining device, the deviation determining device updates said reference position such that, the possibility that the vehicle will deviate from the travel path is easily determined.

In a vehicle travel control apparatus having the structure described above, the smaller the continuous proportion of the quality determination by the recognition condition determining device the deviation determining device determines that there exists a condition requiring caution during travel, and the reference position is updated so that it is easy to determine that the possibility that the vehicle will deviate is high.

For example, the smaller the continuous proportion of the favorable determination, the easier it becomes to determine that the possibility the vehicle will deviate is high due to the reference position approaching the lane marking on the travel path. Depending on the results of this determination, it becomes possible to notify the driver about the necessity of caution during travel at a more suitable timing.

Furthermore, a ninth aspect of the vehicle travel control apparatus according to the present invention comprises a torque detection device (for example, the torque sensor 22 in the embodiments described below) that detects the steering torque input by the driver, a driving attention determining device (for example, a role also played by the LKAS control apparatus 23 in the embodiments described below) that determines the presence or absence of a decrease in the driving attention of the driver by comparing the condition of the change in the steering torque and a predetermined reference value (for example, the driver attention determining threshold value TH2 in the embodiments described below), wherein said driver attention determining device updates the reference value based on the result of the determination of said recognition condition determining device.

According to a vehicle travel control apparatus having the structure described above, in the case, for example, that the condition of the change of the steering torque input by the driver is smaller than a predetermined reference value, the driver attention determining device determines that the driver attention is decreasing. At this time, the driver attention determining device updates the reference value based on the result of the quality determination of the recognition condition determining device, and by making recognition condition of the sequence of recognition processing in the travel path recognizing device and the result of the recognition reflect the setting of the reference value, it is possible to carry out suitable driver attention determination depending on whether there is a condition requiring caution during travel.

Furthermore, in a tenth aspect of the vehicle travel control apparatus according to the present invention, the smaller the continuous proportion of the favorable determination by the recognition condition determining device, said driver attention determining device updates the reference value so that it is easy to determine that said driver attention is decreasing.

According to the vehicle travel control apparatus having the structure described above, the smaller the continuous proportion of the quality determination by the recognition condition determining device, the driver attention determining device determines that there exists a condition requiring caution during travel, and updates the reference value so that it is easy to determine that the driver attention is decreasing. Thereby, it is possible to notify the driver that caution during travel is required at a more suitable timing.

DESCRIPTION OF THE PREFERRED EMBODIMENTS

Figure 1:
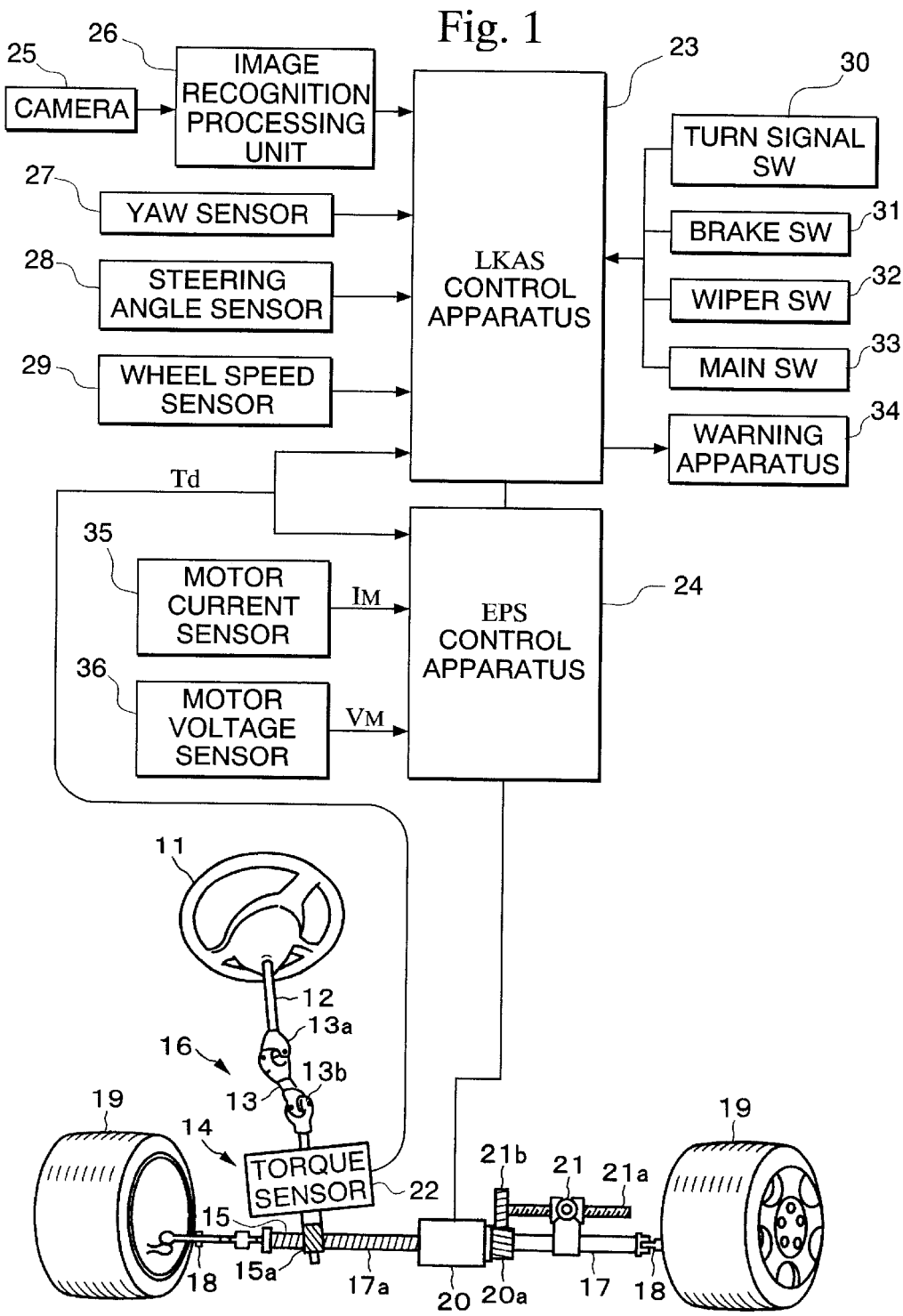
FIG. 1 is a structural diagram of the vehicle travel control apparatus according to an embodiment of the present invention.
Figure 2:
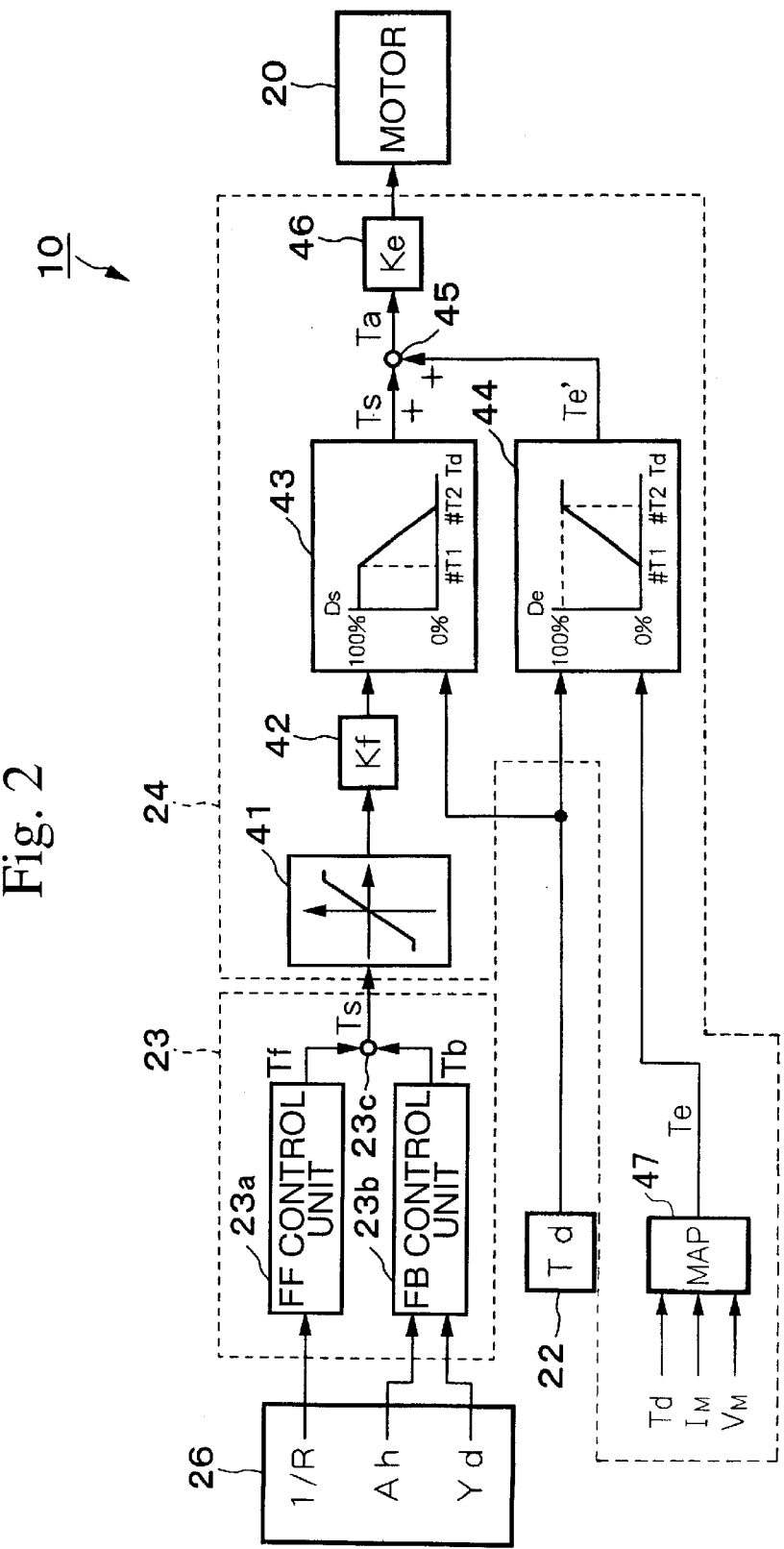
FIG. 2 is a functional block diagram showing the flow of the processing of the steering compensation control by the vehicle travel control apparatus shown in FIG. 1.
Figure 3:
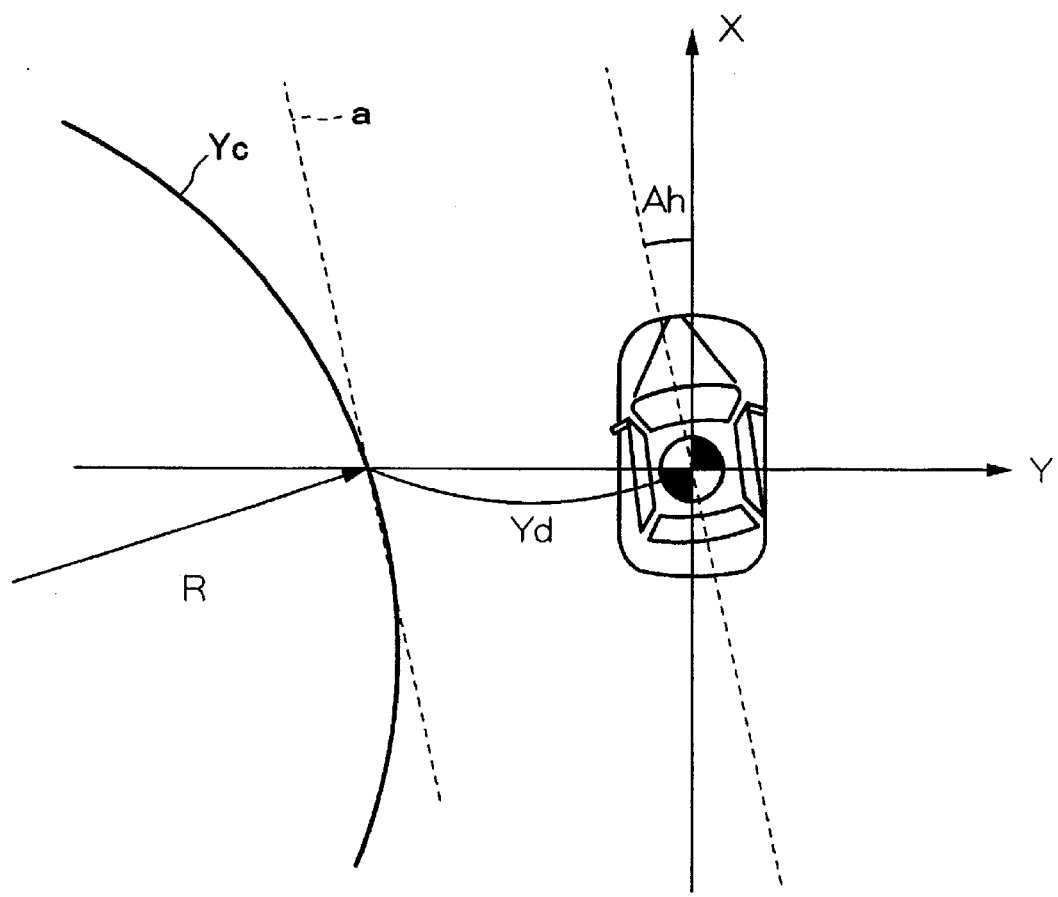
FIG. 3 is a drawing showing the deviation of the vehicle position (transverse offset value) Yd and the vehicle shift angle Ah with respect to the center line Yc of the travel path having a curvature of 1/R.

Below, the vehicle travel control apparatus according to an embodiment of the present invention will be explained with reference to the attached figures. FIG. 1 is a structural diagram of the vehicle travel control apparatus 10 according to an embodiment of the present invention; FIG. 2 is a functional block diagram showing the flow of the processing of the steering compensation control by the vehicle travel control apparatus 10 shown in FIG. 1; and FIG. 3 is a drawing showing the deviation of the vehicle position (transverse offset value) Yd and the vehicle shift angle Ah with respect to the center line Yc of the travel path having a curvature of 1/R.

As shown in FIG. 1, in this vehicle travel control apparatus 10, a manual steering power generating mechanism 16 is formed by a steering axle 12 integrally provided with the steering wheel 11 communicating with the pinion 15a of a rack and pinion mechanism 15 provided in the steering gear box 14 via the communication axle 13 having universal joints 13a and 13b.

The pinion 15a meshes with the rack threads 17a of the rack axle 17, and the rotational movement input from the steering wheel 11 is converted to a reciprocating action of the rack axle 17 via the pinion 15a, and two front steering wheels 19 and 19 are turned by communicating via the tie rods 18 and 18 on both ends of the rack axle 17.

The rack axle 17 and the motor 20 are disposed coaxially, and the rotational power of the motor 20 is converted to a propulsion force via the ball thread mechanism provided substantially parallel to the rack axle 17. Specifically, a drive side helical gear 20a is integrally provided on the rotor (not illustrated) of the motor 20, and this drive side helical gear 20a meshes with the helical gear 21b integrally provided on the end of the screw axle 21a of the ball thread mechanism 21

Inside the steering gear box 14, a torque sensor 22 is provided to detect the steering force Td used in the pinion 15a, that is, the steering torque Td input by the manual operation of the driver, and the detection signal of the steering torque Td detected by the torque sensor 22 is input into the LKAS control apparatus 23 and the EPS control apparatus 24.

The LKAS (lane keeping assistance system) 23 calculates the amount of the compensation of the torque that is necessary for making the vehicle travel along the lane markings on the road in the forward direction of the vehicle as the LKAS control mode. In addition, under predetermined conditions, as a torque command for outputting to the motor 20 this compensation amount, the steering compensating torque Ts is output to the EPS control apparatus.

Thereby, in the LKAS control apparatus 23, in addition to the detection signal of the steering torque Td output from the torque sensor 22, information about the lane markings output from the image recognition processing unit 26 described below, detection signals output from the yaw rate sensor 27 that detects the yaw rate (the angular rotation speed) of the vertical (gravity) axle rotation of the center of gravity of the vehicle, the detection signal output from the steering angle sensor 28 that detects the direction and size of the steering angle input by the driver and acts as a rotary encoder or the like provided, for example, on the steering axle 12, and the detection signal output from the vehicle wheel speed sensor 29 that detects the rotational speed of the wheels are input.

Furthermore, in the LKAS control apparatus 23, the signal that notifies about turning ON and OFF the turn signal output from the turn signal SW 30, the signal notifying about turning ON and OFF the brake output by the brake SW 31, the signal notifying about turning ON and OFF the wipers output from the wipers SW 32, and the signal notifying, for example, about the operation and suspension of the LKAS control apparatus 23 that is output from the main SW 33, are input.

Specifically, the LKAS control apparatus 23 is set so as to suspend output of the steering compensating torque Ts to the EPS control apparatus, for example, in the case that a signal from the turn signal SW 30 notifying that the turn signal is ON, the case that a signal from the brake SW 31 notifying that the brake is turned ON, the case that a signal from the wipers SW 32 notifying that the wipers are turned ON is input, the case that a signal from the main SW 33 notifying about the suspension of the LKAS control system, the case that the extraction processing of the lane marking in the LKAS control apparatus 23 is difficult, or the like.

Furthermore, a warning apparatus 34 that acts as a speaker that outputs warning sounds, voice messages or the like, a display and a lamp that is turned on to carry out warning display or the like, is connected to the LKAS control apparatus 23, and, for example, is set so as to output a warning in the case that the vehicle deviates from inside a predetermined travel region.

The EPS control apparatus 24 outputs a motor drive current in order to output a compensation amount for the steering torque Td to the motor 20 that depends on the travel state of the vehicle.

Thus, in addition to the detection signal of output steering compensating torque Ts output from the LKAS control apparatus 24 and the steering torque Td output from the torque sensor 22, the detection signal (motor current) $I_M$ output from the motor current sensor 35 that detects the energizing current for the motor 20 and a detection signal (motor voltage) $V_M$ output from the motor voltage sensor 36 that detects the energizing voltage of the motor 20 are input into the EPS control apparatus.

In the EPS control mode, the EPS control apparatus 24 calculates the compensation amount for the power steering that assists the steering torque depending of the steering torque Td output by the driver and detected in the torque sensor 22, and calculates the power steering torque Te as a torque command for outputting the compensation amount to the motor 20. In addition, as will be described below, for the EPS control mode, a predetermined control ratio De (for example, a predetermined value equal to or less than 100%) depending on the steering torque Td is set, and the value obtained by using the control ratio De to carry out an operation on the power steering torque Te is set as the new power steering torque Te.

In addition, as will be described below, the EPS control apparatus 23 sets the predetermined control ratio Ds (for example, a predetermined value equal to or less that 100%) that depends on the steering torque Td detected, for example, in the torque sensor 22, and the value obtained by using the control ratio Ds to carry out an operation on the steering compensating torque Ts input from the LKAS control apparatus 23 is set as the new steering compensating torque Ts.

In addition, the EPS control apparatus 24 adds the power steering torque Te according to the EPS control mode and the steering compensating torque Ts according to the LKAS control mode, calculates the compensating torque Ta, and outputs the motor drive current for generating this compensating torque Ta via the drive circuit (not illustrated) of the motor 20.

Below, the processing of the vehicle travel control apparatus, and in particular, the operation of the LKAS control apparatus 23 and the EPS control apparatus 24, according to the present embodiment will be explained with reference to FIG. 2 and FIG. 3.

First, the lane markings in a predetermined region in front of and in back of the vehicle is recorded by a camera 25 provided integrally with the front mirror (not illustrated) inside the front window of the vehicle. In addition, in the image recognition processing unit 26, the lane markings (white lines) are recognized based on image data output by the camera 25.

At this time, as shown for example in FIG. 3, the image recognition processing unit 26, at an appropriate position on the travel path, the curvature 1/R of the travel path is calculated from the turning radius R of the center line Yc of the travel path. Furthermore, the image recognition processing unit 26 establishes a relative coordinate system in which, for example, the current position of the vehicle is made the origin, the forward direction of the vehicle is made the X axis, and the direction perpendicular to this X axis (that is, the traverse direction of the vehicle) is made the Y axis, and calculates the distance Yd (transverse offset amount) up to the center line Yc of the travel path from the current position of the vehicle on the Y axis and the angle Ah (vehicle shift angle) between the X axis and the tangent a of the center line Yc at the position of the intersection of the center line Yc of the travel path and the Y axis.

In addition, the image recognition processing unit 26 outputs to the FF control unit 23a of the LKAS control apparatus 23 the calculated curvature 1/R of the travel path, and outputs to the FB control unit 23b of the LKAS control apparatus 23 the transverse offset amount Yd and the vehicle shift angle Ah.

The FF control unit 23a of the LKAS control apparatus 23 calculates the basic steering compensating torque Tf from the curvature 1/R of the travel path by the feed forward control based on their predetermined characteristics, and outputs the result to the adder unit 23c.

In addition, the FB control unit 23b of the LKAS control apparatus 23 calculates the corrected steering compensating torque Tb based on the transverse offset amount Yd and the vehicle shift angle Ah by feedback control, and outputs the results to the adder unit 23c.

Moreover, the basic steering compensating torque Tf is the compensating torque for preserving the equilibrium with respect to the cornering force of the vehicle, and the corrected steering compensating torque Tb is the compensating torque for making the vehicle travel along the center line Ye of the travel path and preserving the stability of the vehicle.

The adding unit 23a adds the basic steering compensating torque Tf and the corrected steering compensating torque Tb, calculates the steering compensating torque Ts necessary for making the vehicle travel along the lane markings, and outputs the result to the limiting value setting unit 41 of the EPS control apparatus 24.

The limiting value setting unit 41 of the EPS control apparatus sets the limiting value for the motor drive current supplied to the motor 20 and the steering compensating torque Ts.

The first control gain operation unit 42 outputs the value obtained by carrying out an operation using a predetermined first control gain Kf on the steering compensating torque Ts to the LKAS control ratio calculating unit 43 as the new steering compensating torque Ts.

The LKAS control ratio calculating unit 43 calculates the predetermined control ratio Ds for the LKAS control mode based on the steering torque Td detected at the torque sensor 22, and the value obtained by using this control ratio Ds to carry out an operation on the steering compensating torque Ts is output to the adding unit 45 as the new steering compensating torque Ts.

For example, in the case that the steering torque Td is equal to or less than a predetermined first torque #T1, the control ratio Ds is made equal to 100%; in the case that the steering torque Td is equal to or greater than a predetermined first torque #T1 and is equal to or less than a predetermined second torque #T2, the control ratio Ds tends to decrease; and in the case that the steering torque Td is equal to or greater than a predetermined second torque #T2, the control ratio Ds is made equal to 0%.

In addition, the EPS control ratio calculating unit 44 calculates the predetermined control ratio De for the EPS control mode based on the steering torque Td detected by the torque sensor 22, and the value obtained by using this control ratio D3 to carry out an operation on the power steering torque Te found from the steering torque Td, the motor current $I_M$, and the motor voltage $V_M$ by using a predetermined map 47 is output to the adding unit 45 as the new power steering torque Te'.

For example, in the case that the steering torque Td is equal to or less than a predetermined first torque #T1, the control ratio Ds is made equal to 0%; in the case that the steering torque Td is equal to or greater than a predetermined first torque #T1 and equal to or less than a predetermined second torque #T2, the control ratio Ds tends to increase; and in the case that the steering torque Td is equal to or greater than a predetermined second torque #T2, the control ratio Ds is made equal to 100%.

The adding unit 45 adds to power steering torque Te' to the steering compensating torque Ts, and calculates the compensating torque Ta that is the target value of the torque generated by the motor 20.

The second control gain operating unit 46 uses a predetermined second control gain Ke to carry out an operation on the compensating torque Ta, calculates the energizing current value necessary for generating the compensating torque Ta to the motor 20, and outputs the motor drive current based on this energizing current value to the motor 20.

Moreover, in the present embodiment the LKAS control apparatus 23 calculates the steering compensating torque Ts and outputs the result to the EPS control apparatus 24, but in the LKAS control unit 23, it is also possible to convert the steering compensating torque Ts to a motor drive current and output this to the EPS control apparatus 24.

The vehicle travel control apparatus 10 according to the present embodiment provides the structure described above, and next, the operation of this vehicle travel control apparatus 10 will be explained with reference to the attached figures.

Figure 4:
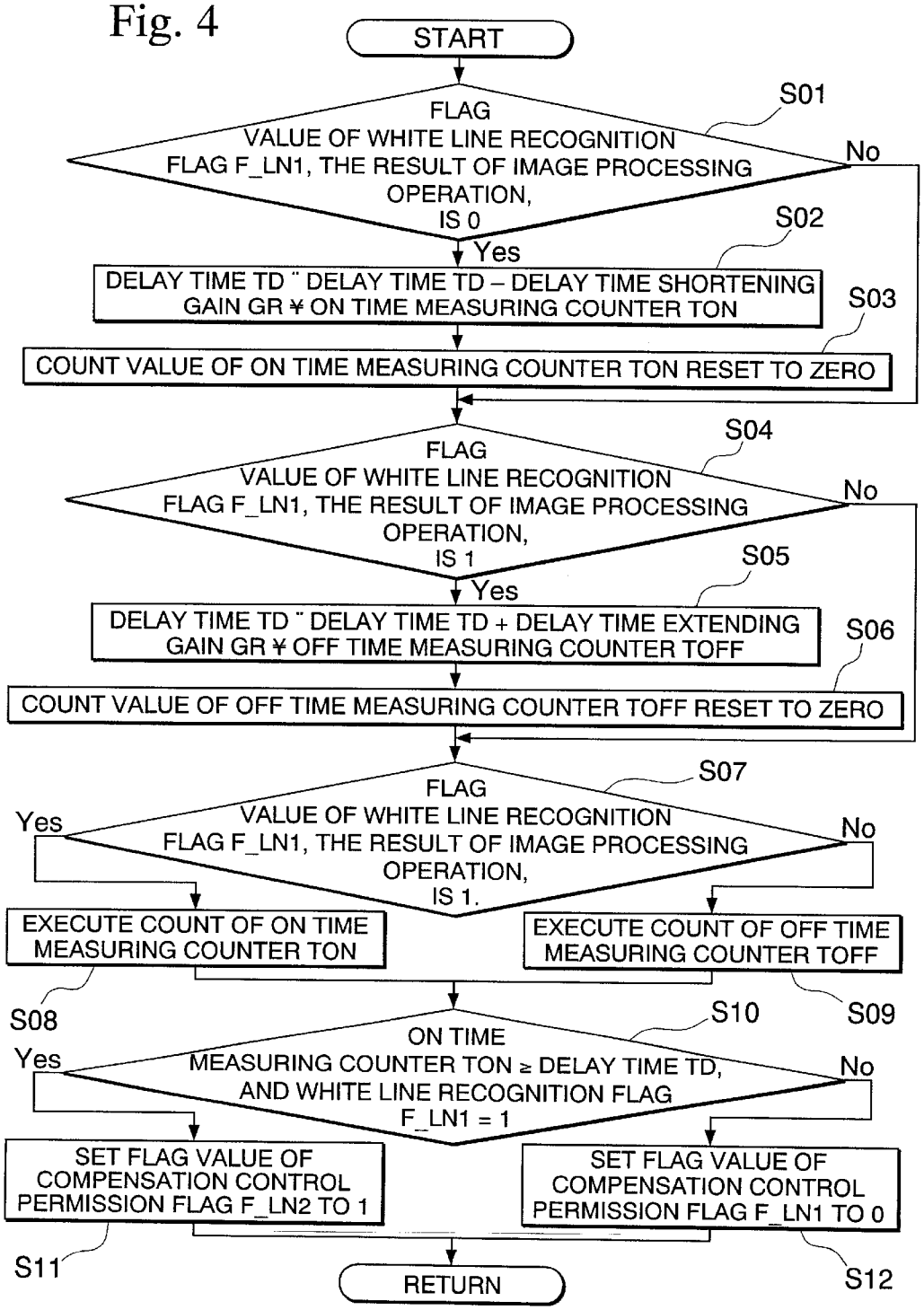
FIG. 4 is a flowchart showing the operation of the vehicle travel control apparatus shown in FIG. 1.
Figure 5:
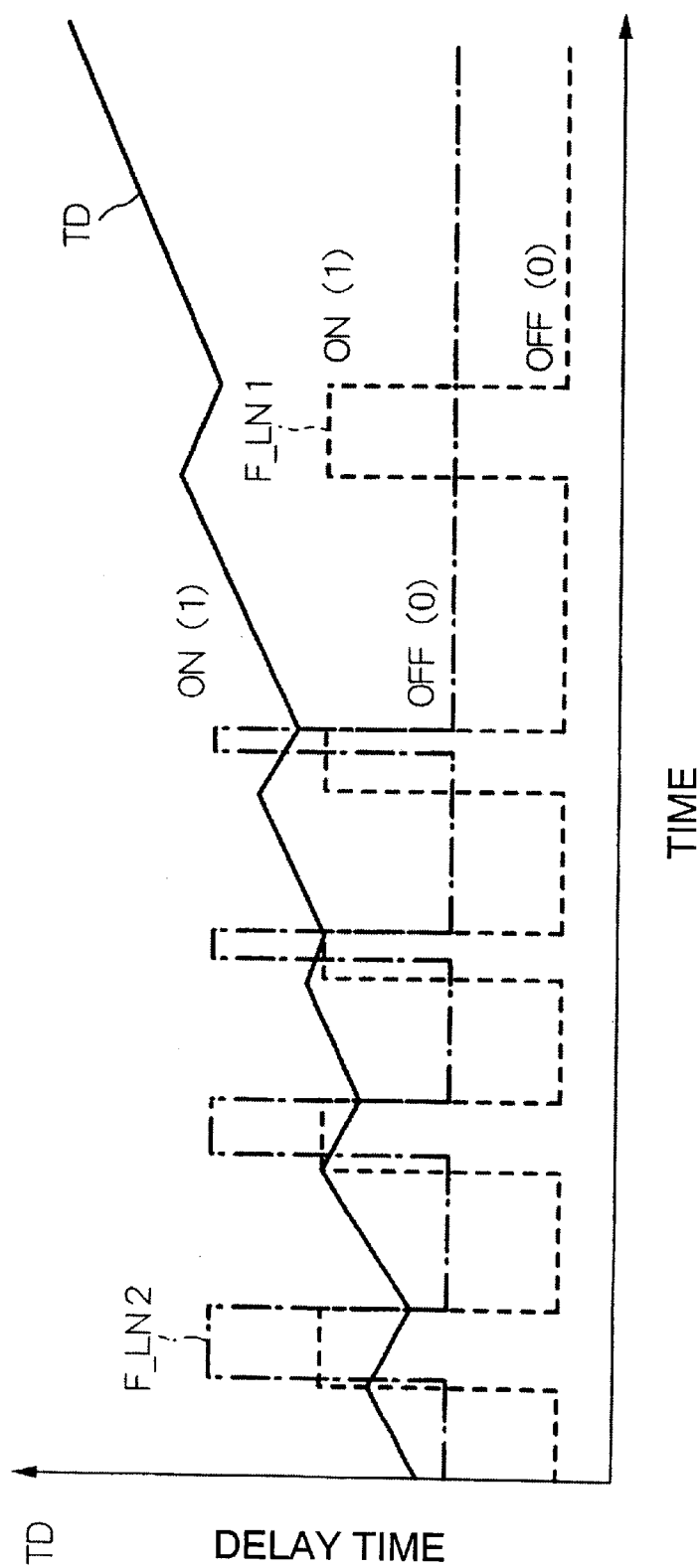
FIG. 5 is a graph showing the change in the delay time TD that depends on the change in each graph value of the white line recognition flag F_LN1 and the compensation control permission flag F_LN2.
Figure 6:
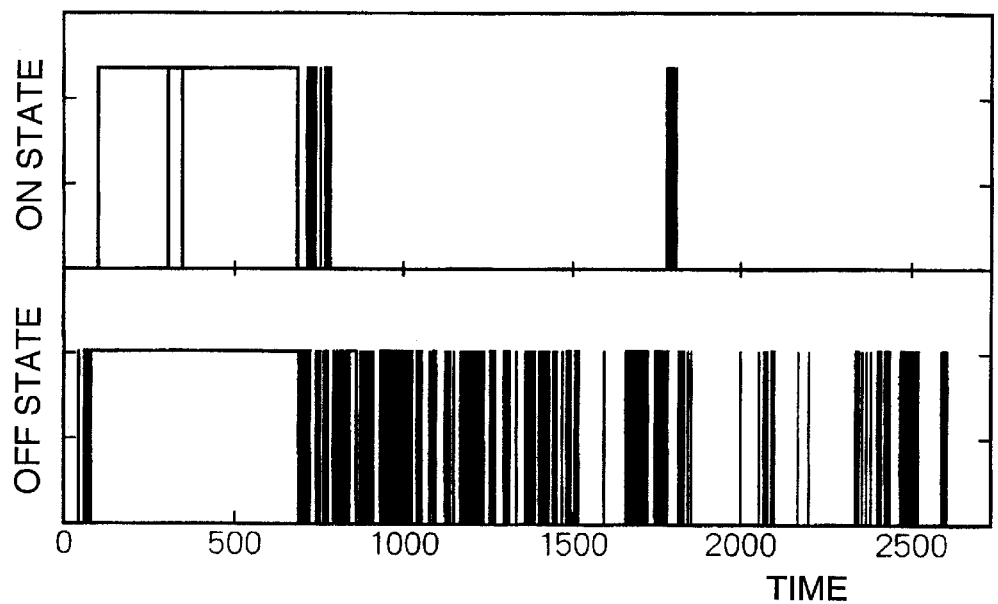
FIG. 6 is a graph showing an example of the time change in the generation frequency of each event with respect to the ON state and OFF state of the travel control when the delay time shortening gain GE=1 and the delay time extending gain GR=1.

FIG. 4 is a flowchart showing the operation of the vehicle travel control apparatus 10; FIG. 5 is a graph showing the change in the delay time TD that depends on the change in each graph value of the white line recognition flag F_LN1 and the compensation control permission flag F_LN2; and FIG. 6 is a graph showing an example of the change through time in the generation frequency of each event with respect to the ON state and OFF state of the travel control when the delay time shortening gain GE=1 and the delay time extending gain GR=1.

First, in step S 01 shown in FIG. 4, it is determined whether or not the flag value of the white line recognition flag F_LN1, which is the result of the image processing operation output from the image recognition processing unit 26, is 0.

In the case that the result of the determination is NO, that is, in the case that there exists a recognition state in which the white line is recognized, the processing proceeds to step S 04 described below.

In contrast, in the case that the result of the determination is YES, that is, in the case that there exists a non-recognition state in which the white line is not recognized, the processing proceeds to step S 02.

Moreover, the flag value of the white line recognition flag F_LN1 takes the value 0 in the case, for example, that the white line is not recognized because of accumulated snow on the travel path, the reflection of light on a wet road surface, or the like, or the case in which the white line in a tunnel or the like itself has become covered by dirt.

In step S 02, with respect to the delay time TD during travel control by the travel control apparatus 10, for example, when reverting from the OFF state to the ON state of the control for making the vehicle travel along the recognized white lines, the value obtained by subtracting the value obtained by multiplying the ON time measuring counter TON by the predetermined delay time shortening gain GR from the currently set delay time TD is set as the new delay time TD.

This delay time TD denotes the time from the time that the recognition of the white line restarts to the actual reversion to the ON state when again reverting to the ON state of the travel control to allow recognition of white lines in the case that, for example, the travel control is in an OFF state that does not allow recognition of the white lines, and is set so that reversion to the ON state of travel control occurs only in the case that recognition of the white line continues over the interval of this delay time TD.

In addition, the ON time measuring counter TON denotes a timer value indicating the continuous time interval of the state in which the flag value of the white line recognition flag F_LN1 is 1, that is, the recognition state in which the white line is recognized.

In addition, in step S 03, the count value of the ON time measuring counter TON is set to zero, and the count value is reset.

In addition, in step S 04, it is determined whether or not the flag value of the white line recognition flag F_LN1, which is the result of an image processing operation, is 1.

In the case that the result of the determination is NO, that is, there exists a non-recognition state in which the white line is not recognized, the processing proceeds to step S 07 described below.

In contrast, in the case that the result of the determination is YES, that is, there exists a recognition state in which the white line is recognized, the processing proceeds to step S 05.

In step S 05, the value obtained by adding the value obtained by multiplying the OFF time measuring counter TOFF by the predetermined delay time extending gain GE is added to the current delay time TD, and the result is set as the new delay time TD.

Here, the OFF time measuring counter TOFF denotes a timer value that indicates the state in which the flag value of the white line recognition flag F_LN is 0, that is, the continuous time interval of the non-recognition state in which white lines are not recognized.

In addition, in step S 06, the count value of the OFF time measuring counter TOFF is set to zero, the count value is reset.

In addition, in step S 07, it is determined whether or not the flag value of the white line recognition flag F_LN1, which is the result of the image processing operation, is 1.

In the case that the result of the determination is YES, that is, in the case that there exists a recognition state in which the white lines are recognized, the processing moves to step S 08, and the count of the ON hour measuring counter TON is carried out. Then the processing proceeds to step S 10 described below.

In contrast, in the case that the result of the determination is NO, that is, in the case that there exists a non-recognition state in which white lines are not recognized, the processing proceeds to step S 09, and the count of the OFF time measuring counter TOFF is carried out. Then the processing proceeds to step S 10.

In step S 10, it is determined whether or not the count value of the ON time measuring counter TON is equal to or greater than the delay time TD, and the flag value of the white line recognition flag F_LN1, which is the result of an image processing operation, is 1.

In the case that the result of the determination is YES, that is, in the case that the condition for reverting to the ON state of travel control is satisfied, the processing proceeds to step S 11, the flag value of the compensation control permission flag F_LN2 is set to 1, the reverting to the ON state of the travel control based on the recognized white line is permitted, and the sequence of processing ends.

In the case that the result of the determination is NO, that is, in the case that the conditions for reverting to the ON state of the travel control are not satisfied, the processing proceeds to step S 12, the flag value of the compensation control permission flag F_LN2 is set to 0, and the sequence of the processing ends without permission to revert to the ON state of travel control based on the recognized white line.

For example, as shown in FIG. 5, along with the passage of time, the road surface condition on which the vehicle travels deteriorates, and when there exists a non-recognition state in which the white line is not recognized, that is, the interval in which the flag value of the white line recognition flag F_LN1 becomes 0 becomes long, the delay time TD is extended. Thereby, even in the case that the flag value of the white line recognition flag F_LN1 becomes 1 and the state reverts to the recognition state in which the white line is recognized, the flag value of the compensation control permission flag F_LN2 is not immediately set to 1, and after the recognition state of the white line continues for a predetermined time, that is the interval of the delay time TD, the flag value of the compensation control permission flag F_LN2 is set to 1, and reverting to the ON state of travel control based on the recognized white line is permitted.

At the same time, when the road surface state on the vehicle travels is favorable and the interval of the recognition state in which the white line is recognized becomes long, the delay time TD is shortened, and immediately the reversion to the ON state of the travel control is set.

Here, in the case that the flag value of the white line recognition flag F_LN1 has changed from 1 to 0, depending on the continuous time interval of the recognition state (that is, the count value of the ON time measuring counter TON) where immediately before the flag value of the white line recognition flag F_LN1 was 1, the delay time TD is shortened. In contrast, in the case that the flag value of the white line recognition flag F_LN1 has changed from 0 to 1, depending on the continuous time interval of the non-recognition state (that is, the count value of the OFF time measuring counter TOFF) where immediately before the flag value of the white line recognition flag F_LN1 is 0, the delay time TD is extended.

Furthermore, the delay time TD is added to the count value of the ON time measuring counter TON and can be shortened depending on a predetermined delay time shortening gain GR. Also, the delay time TD is added to the count value of the OFF time measuring counter TOFF and can be extended depending on a predetermined delay time extending gain GE. Specifically, by setting each of the gains GR and GE to appropriate values, it is possible to suppress frequent switching between the ON state and the OFF state of the travel control based on the recognized white line, and it is possible to prevent the driver from feeling worried.

For example, as shown in FIG. 6, by setting each of the gains GR and GE to 1, frequent switching between the ON and OFF state of the travel control can be suppressed, while in contrast when, for example, the delay time shortening gain GR is increased, the frequency of the ON state increases, and the driver may feel worried.

As described above, according to the vehicle travel control apparatus 10 in the present embodiment, even in the case that the flag value of the white line recognition flag F_LN1 changes and there is a change to the recognition state in which the white line is recognized or the non-recognition state in which the white line is not recognized, and the flag value of the compensation control permission flag F_LN2 is not changed immediately after the recognition state or the non-recognition sate continues over the interval of a predetermined delay time TD, a change from the ON state or the OFF state of the travel control is permitted.

Thereby, even in the case that the flag value of the white line recognition flag F_LN1 switches frequently due to the condition of the road surface that is traveled or the like, the frequent switching of the flag value of the compensation control permission flag F_LN2 that accompanies this change can be prevented, the switching to the ON state or the OFF state of the travel control can be carried out at an appropriate frequency, and imparting a feeling of discomfort to the driver during travel control can be prevented.

Further, in addition to the ON time measuring counter TON and the OFF time measuring counter TOFF in the previous processing by being able to update this depending on a predetermined delay time shortening gain GR or a delay time extending gain GE, it is possible to determine even more suitably whether or not there exists a state to which the execution of the travel control can be applied.

Figure 7:
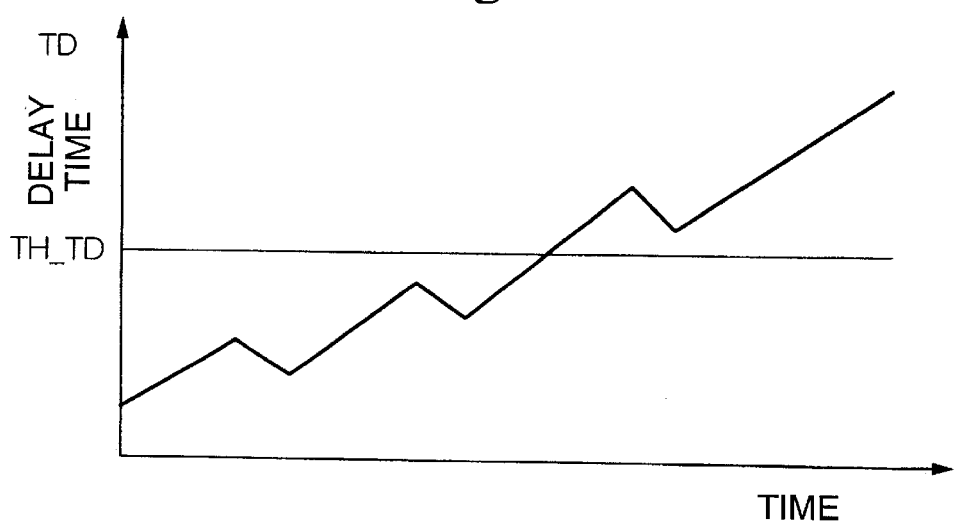
FIG. 7 is a graph showing the time change of the delay time TD.

Moreover, in the present embodiment, the ON state and the OFF state of the travel control were switched depending on the flag value of the compensation control permission flag F_LN2, but the embodiment is not limited thereby. For example, like the flag diagram showing the change over time of the delay time TD showed in FIG. 7, a predetermined threshold delay time TH_TD can be set for the delay time TD, and at the point in time that the delay time TD exceeds the threshold delay time TH_TD, for example, the road surface condition during travel has worsened and it is determined that stably carrying out recognition of the white line has become difficult, and the flag value can be set so as to revert to the OFF state of the travel control.

Figure 8:
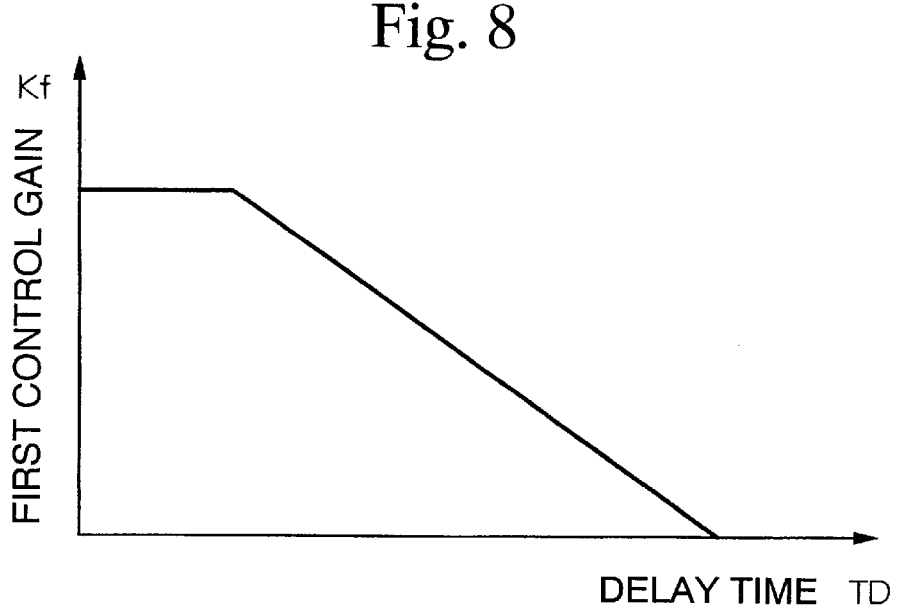
FIG. 8 is a graph showing the change in the first control gain Kf depending on the delay time TD.

In addition, in the present embodiment, like the graph showing the change of the first control gain Kf depending on the delay time TD shown in FIG. 8, in the case that that delay time becomes long, the first control gain Kf, that is, the value of the operation support rate by the travel control, is lowered, and carrying out excessive travel control can be suppressed when stable white line recognition becomes difficult.

Figure 9:
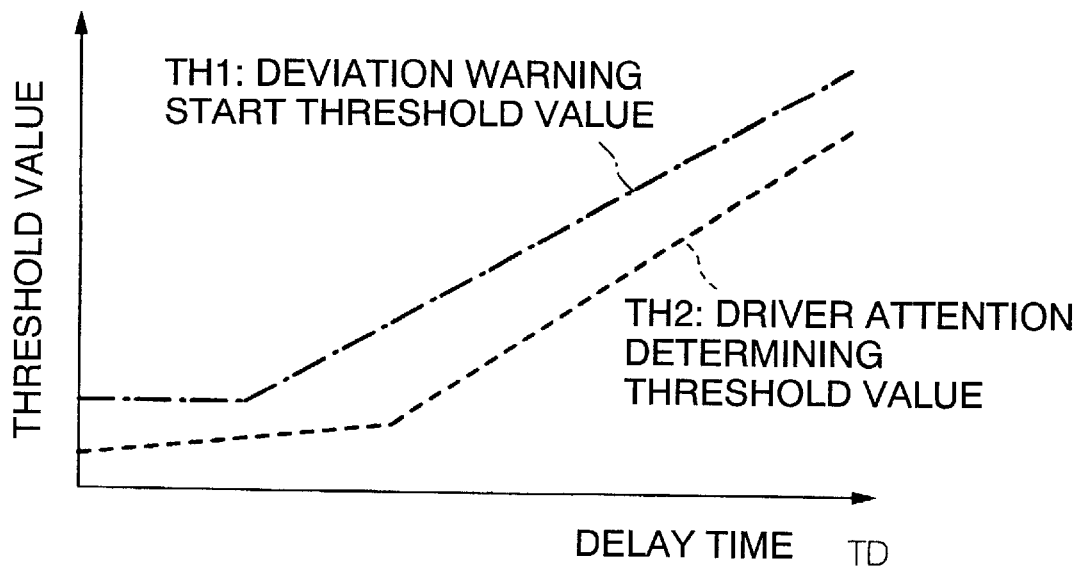
FIG. 9 is a graph showing the change in the deviation warning start threshold value TH1 and the driver attention determining threshold value TH2 depending on the delay time TD.

Furthermore, in the present embodiment, like the graph showing the change in the deviation warning start threshold TH1 and the driver attention determining threshold TH2 depending on the delay time TD shown in FIG. 9, in the case that the delay time TD becomes long, it is determined that the road surface condition during travel is worsening, and the deviation warning start threshold TH1 for determining whether or not to notify the driver that the vehicle is deviating from the predetermined travel region is lowered, and the warning can be set so as to be easily output. Similarly, in the case that the delay time has become long, it is determined that the road surface condition during travel is worsening, the driver attention determining threshold TH2 for determining whether or not to notify that the driver attention is lowering is lowered, and can be set so that determining that the driver attention is lowering is easy to determine.

Figure 10:
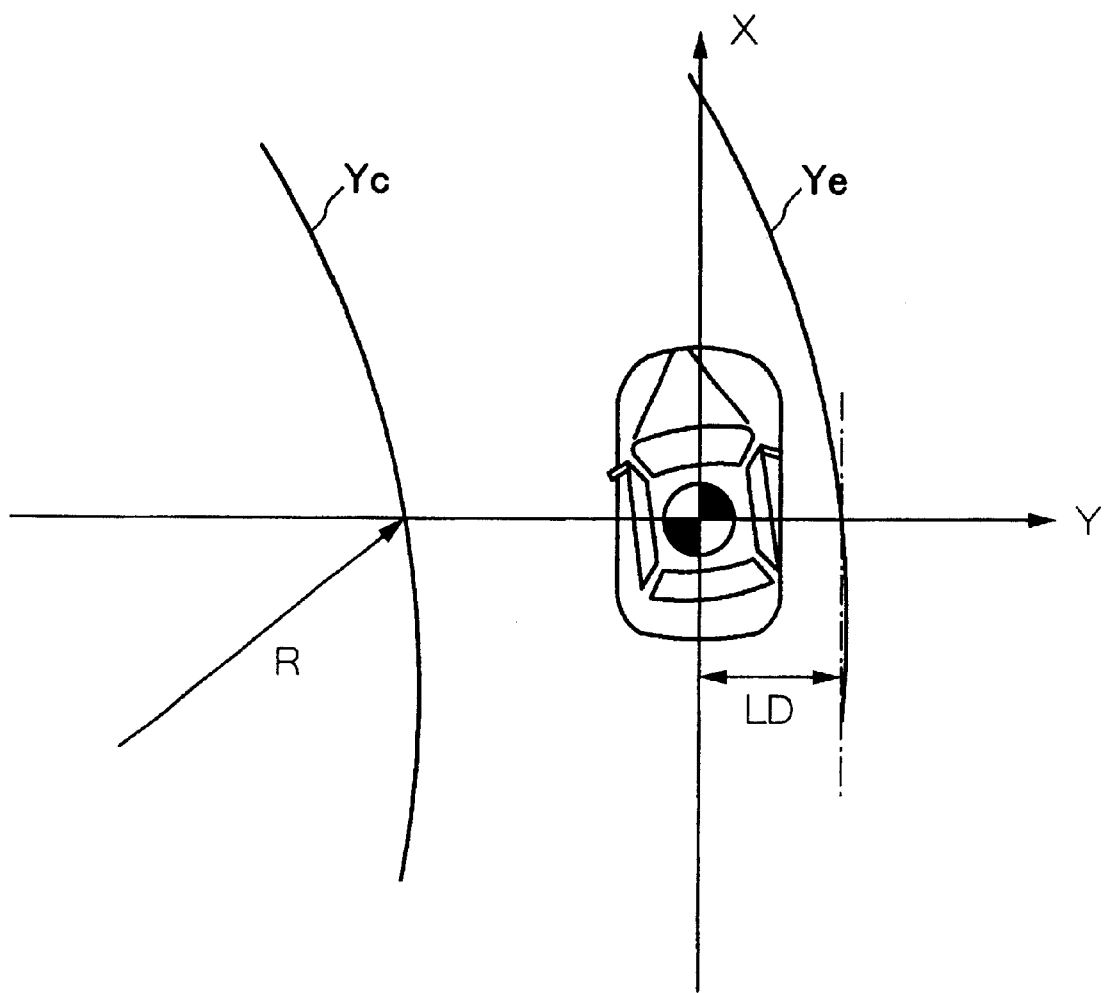
FIG. 10 is a graph showing the distance LD from the present position of the vehicle to the border line Ye of the travel path.

Moreover, the deviation warning start threshold TH1 can denote a predetermined threshold value with respect to the transverse offset amount Yd described above, and for example, as shown in FIG. 10, it can be a predetermined threshold value with respect to the distance LD from the current position of the vehicle on the Y axis to the border line Ye of the travel path.

In addition, in the present invention, the steering torque Td of the driver is compensated, but of course this can be applied to the automatic operation as well.

As explained above, in a first aspect of the vehicle travel control apparatus of the present invention, even in the case that the quality determination in the recognition condition determining device switches frequently, it is possible to prevent the accompanying the possibility of execution of the travel control from switching frequently, and the recognition condition determining device appropriately sets the possibility of execution of the travel control such that it is appropriately switched depending on each continuation condition of a favorable determination or unfavorable determination, and thereby it is possible to prevent the driver from feeling discomfort.

Furthermore, in a second aspect of the vehicle travel control apparatus of the present invention, the travel control device can determine the possibility of executing travel control by suitable determining whether or not it is in a state appropriate for executing the travel control using the result of the recognition of the travel path recognizing device based on the reference time, and thereby it is possible to prevent making the driver feel discomfort while travel control is being executed.

Furthermore, in a third aspect of the vehicle travel control apparatus of the present invention, for example, in the case that the favorable determination in the recognition condition determining device switches frequently, the travel control device determines that a state that is appropriate for executing travel control using the result of the recognition of the travel path recognition device does not exist, and frequent switching of the possibility of execution of the travel control can be prevented, and thereby it is possible to prevent making the driver feel discomfort while the travel control is being carried out.

Furthermore, in a fourth aspect of the vehicle travel control apparatus of the present invention, the possibility of execution of the travel control can be switched even more appropriately for example, by allowing updating depending on the ratio of the increase or the ratio of the decrease of the reference time in addition to each continuous time interval of the favorable determination when updating the reference time that serves as the delay time or the like when switching the possibility of execution of the travel control.

Furthermore, in a fifth aspect of the vehicle control apparatus of the present invention, the switching timing of the possibility of execution of the travel control can be appropriately set, and at the same time, the compensation proportion of the steering torque can be set to an appropriate value, and it is possible to prevent even further making the driver feel discomfort during travel control.

Furthermore, in a sixth aspect of the vehicle travel control apparatus according to the present invention, during the condition suitable to executing the travel control, the steering of the driver is appropriately assisted during travel on a high-speed highway during clear or rainy weather or the like.

Furthermore, in a seventh aspect of the vehicle travel control apparatus according to the present invention, the deviation determining device carries out suitable deviation determination depending on whether or not thee exists a condition requiring caution during travel by updating the reference position based on the result of the quality determination by the recognition condition determining device.

Furthermore, in an eighth aspect of the vehicle travel control apparatus according to the present invention, the smaller the continuous proportion of the favorable determination, the easier it becomes to determine that the possibility the vehicle will deviate is high due to the reference position approaching the lane marking on the travel path. Depending on the results of this determination, it becomes possible to notify the driver about the necessity of caution during travel at a more suitable timing.

Furthermore, in a ninth aspect of the vehicle travel control apparatus according to the present invention, the driver attention determining device can carry out suitable driver attention determination depending on whether or not there exists a condition requiring caution during travel by updating the reference value based on the result of the quality determination by the recognition condition determining device.

Furthermore, in a tenth aspect of the vehicle travel control apparatus according to the present invention, the smaller the continuous proportion of the quality determination by the recognition condition determining device, the driver attention determining device determines that there exists a condition requiring caution during travel, and updates the reference value so that it is easy to determine that the driver attention is decreasing. Thereby, it is possible to notify the driver that caution during travel is required at a more suitable timing.

What is claimed is:

1. A vehicle travel control device comprising:
   a travel path recognizing device which recognizes the travel path of the vehicle;
   a recognition condition determining device which determines whether or not the recognition condition of said travel path recognizing device is good; and
   a travel control device which determines appropriateness for executing the travel control for the vehicle using the determination results of the recognition condition of said travel path recognizing device based on the results of the determination of said recognition condition determining device;
   wherein, said travel control device determines the appropriateness of executing the travel control for the vehicle based on at least any one of a continuous conditions determined by said recognition condition determining device whether the recognition condition is favorable or unfavorable.

2. A vehicle travel control device according to claim 1, wherein said continuous condition by said recognition condition determining device is the continuous time interval from the time when the recognition condition determining device starts determining whether the recognition condition is favorable or not, and
   said travel control device determines the appropriate time for executing the travel control of the vehicle based on a reference time that is increased or decreased depending on said continuous time interval.

3. A vehicle travel control apparatus according to claim 2, which comprises a reference time update device that decreases said reference time in the case when said recognition condition determining device determines the recognition condition is favorable and increases said reference time in the case when said recognition condition determining device determines the recognition condition is unfavorable, and said travel control device compares said reference time with the appropriate time interval that is the continuous time interval from the start time of determining that said recognition condition determination device determines that the recognition condition is favorable, and when said favorable determination continuous time interval is longer than said reference value, the execution of the travel control of the vehicle is permitted.

4. A vehicle travel control apparatus according to claim 3, wherein said vehicle travel control device is capable of changing at least one of either the ratio of the decrease when decreasing said reference time in the case that the determination by said recognition condition determining device is favorable or the ratio of the increase when increasing said reference time in the case that the determination by said recognition condition determining device is unfavorable.

5. A vehicle travel control apparatus according to claims 1 comprising:
   an actuator that drives a steering mechanism that can steer the front steering wheels of the vehicle; and
   a drive control device that drives said actuator such that the vehicle travels along said travel path that has been recognized by said travel path recognizing device;
   wherein said drive control device updates the assisting proportion when assisting said steering torque based on the result of the determination of said recognition condition determining device.

6. A vehicle travel control apparatus according to claim 5 wherein, the larger the continuing proportion lasts while the determination by said recognition condition determination device is favorable, the larger said assisting proportion for assisting the torque increases.

7. A vehicle travel control apparatus according to claims 1, comprising:
   a deviation determining device that recognizes the position of the vehicle in the traverse direction of the travel path based on the result of the recognition of said travel path recognizing device, and when the position of this vehicle arrives at a predetermined reference position that indicates the deviation from the travel path, that determines there is a possibility that the vehicle deviate from the travel path,
   wherein said deviation determining device updates said reference position based on the result of the determination of said recognition condition determining device.

8. A vehicle travel control apparatus according to claim 7 wherein the smaller the continuous proportion of the favorable determination by said recognition condition determining device, said deviation determining device updates said reference position such that, the possibility that the vehicle deviate from the travel path is easily determined.

9. A vehicle travel control apparatus according to claims 1, further comprising:

a torque detection device that detects the steering torque input by the driver; and a driving attention determining device that determines whether or not the driving attention of the driver decreases by comparing the condition of the change in said steering torque and a predetermined reference value, wherein said driver attention determining device updates said reference value based on the result of the determination of said recognition condition determining device.

10. A vehicle travel control apparatus according to claim 9 wherein the smaller the continuous proportion of the favorable determination by said recognition condition determining device, said driver attention determining device updates said reference value so that it is easy to determine that said driver attention is decreasing.

* * * * *